Figure 1:
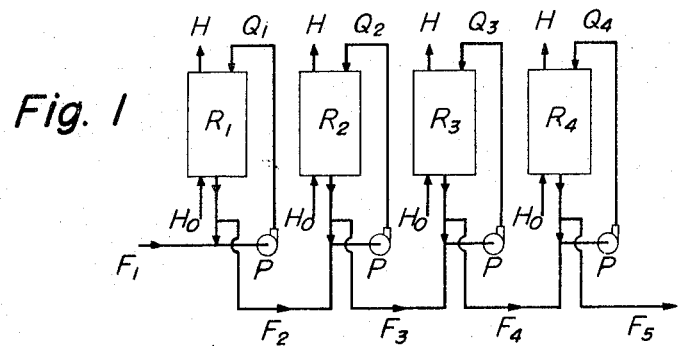

Jan. 31, 1967   SHIGEO KAWASAKI ETAL   3,301,909
PROCESS FOR CONTINUOUSLY HYDROGENATING
HIGHER ALDEHYDES IN LIQUID PHASE
Filed April 16, 1962

INVENTORS
SHIGEO KAWASAKI
HIDEO YUSA
MIKIO SHINKAI

BY Paul M. Craig, Jr.
ATTORNEY 3,301,909
PROCESS FOR CONTINUOUSLY HYDROGENATING HIGHER ALDEHYDES IN LIQUID PHASE
Shigeo Kawasaki, Suginami-ku, Tokyo, Hideo Yusa, Minamata-shi, and Mikio Shinkai, Kanazawa-ku, Yokohama, Japan, assignors to Chisso Corporation, a corporation of Japan
Filed Apr. 16, 1962, Ser. No. 187,618
Claims priority, application Japan, Apr. 25, 1961, 36/14,648
4 Claims. (Cl. 260—638)

The present invention relates to a process for continuously hydrogenating higher aldehydes in the liquid phase. In another aspect, the present invention relates to an improvement in or relating to a process for the continuous hydrogenation of higher aldehydes, ordinarily having 6 to 13 carbon atoms, in the liquid phase in the presence of a solid catalyst. More particularly, the present invention relates to a process for continuously hydrogenating higher aldehydes by the use of a multi-stage, liquid phase, continuous hydrogenation apparatus including sprinkling and recycling towers. For the purpose of maintaining easy control of the reaction and the highest degree of hydrogenation ratio, two or more multi-tube reactors of the sprinkling type, or the same in combination with a single-tube reactor (or reactors), are arranged in series and the amount of recycled liquid, the combination of the reactors, the particle size of catalyst, the amount of sprinkling liquid, and the mode of liquid distribution is suitably selected.

Concerning the hydrogenation of aldehydes to obtain the corresponding alcohols, such processes in the gas phase and the liquid phase have been conducted. In the gas phase hydrogenation processes, the reaction is effected, in general, by passing the reactant gas through a catalyst layer of the fixed bed type in a reactor. Although this process has an advantage in being readily adaptable to a continuous system, it can not be free from such disadvantages in that the whole catalyst layer is difficultly kept uniform within a temperature range suitable for the reaction, because of the smaller heat capacity due to gas phase of the reactant, and that the use of an excess amount of hydrogen generally requires recovery of the hydrogen after the reaction, thereby further requiring separation of the reaction product by condensation thereof from a mixture with a large amount of non-condensable gas, which separation causes disadvantages from the thermoelectric point of view, coupled with the preliminary process for vaporizing the aldehyde material. Besides, heating of highly reactive aldehyde in an evaporator causes formation of high-boiling substances, which not only lower the efficiency, but causes adhesion of resinous products in the evaporator and/or at the inside of pipes, thereby forcing an interruption of the operation due to constriction or blocking of pipes. Such resin deposits onto the surface of the catalyst, and lowers the activity and the life thereof. The defects of the gas phase process as mentioned above are, in general, more significant when the aldehyde to be hydrogenated is a higher one.

The liquid phase hydrogenation processes may be divided into two broad classes, namely, batch and continuous systems. The batch system requires a complex procedure, does not give uniform quality of product, and can not avoid the time loss required for the charge of material and the discharge of product, thus being inadequate for large scale production.

As to continuous gas-liquid-contacting type reactors using solid catalyst, three kinds, namely, suspended catalyst stirring type, fluidized catalyst type, and fixed catalyst sprinkling type, have been known. The suspended catalyst stirring type reactor provides a serpentine pipe cooler or a jacketed pipe cooler by which the reaction heat can readily be absorbed. Thus, this type of reactor has been utilized heretofore for hydrogenation of fat and other organic compounds such as nitrobenzene and isopropylethylene. However, this stirring type of reactor has heretofore been used in most cases in a batch system, since this type is rather inherently adaptable to this system. If it is utilized in a continuous system, the steps of separation and recovery of catalyst cause bottlenecks. Besides, it has such shortcomings as that the catalyst gradually turns to a thick slurry by pulverization by the stirrer, and that the operations of the whole steps are extremely complex since contact of the catalyst with air have to be avoided for maintenance of the actitvity.

The fluidized catalyst type is broadly utilized in a number of liquid phase higher pressure hydrogenation reactions, including hydrogenation reactions to produce oxo-alcohols. In this type, a catalyst is suspended in a liquid, into which hydrogen is blown. A fluidized catalyst bed system wherein the liquid is moved at a velocity such that the catalyst remains in a fluidized layer in the reactor tube, and a system wherein the liquid to be reacted and a slurry containing the solid catalyst suspended therein are contacted countercurrently to hydrogen in multistage towers, are known, and systems of blowing gas in a liquid column, wherein gas and liquid are concurrent in the liquid in which the catalyst is moved, or gas is blown into a circulating liquid, are often times used. However, these systems have such shortcomings in general in that the filtration of the catalyst powder in the produced reaction liquid is difficult because of the original fineness of the powdered catalyst, in order to keep it suspended in the liquid, thereby the procedure being complex, and that the loss of catalyst is considerable. In some cases, the catalyst is finely divided up to the gel state due to the friction in the fluidized layer, and is more difficultly filtered. Particularly, the catalyst thus extremely slurried can not be reused by circulation.

In this system, moreover, blocking of pipes or gas distributing plates tends to occur, as in ordinary processes in which powder is dealt with. From the reaction engineering point of view, the reaction liquid does not completely form piston flow but does form inverse mixing flow to a considerable degree, due to the agitation caused by the ascension of hydrogen foams. The latter flow causes a significantly deleterious effect on the conversion, when compared with the former flow, since the objective component in the reactant flow in the reaction tube of the liquid phase hydrogenation reaction is liquid. Furthermore, the inverse mixing flow causes an excess retention time of a part of the liquid, which may cause unfavorable side-reactions or sometimes cause a loss in hydrogen pressure.

In the fixed catalyst sprinkling type of reactor, a liquid is flowed down from the top of a straight reactor tube filled with catalyst particles to wet or soak the surface of the catalyst, while a hydrogen gas stream is introduced concurrently or counter-currently to the liquid to react therewith. In this type, little catalyst is lost, and there is required no filtration of catalyst as in the other reaction systems. The flow of liquid in the tower is almost in piston flow, and the reaction is readily completed before discharge from the reaction tube, with little side-reactions. As the catalyst is well contacted with hydrogen, this type is adequte for such reaction in which the velocities of diffusion of hydrogen into the liquid and of adsorption on the surface of the catalyst, determine the total reaction velocity.

Against these general advantages, there are some difficulties in the sprinkling type. Namely, the distribution of liquid is insufficient, therefore, the catalyst filled does not fully play its role. Also, the greatest shortcoming of the sprinkling type is in inferior heat-conductivity in the catalyst layer, which tends to cause insufficient removal of the reaction heat. For the purpose of removing the reaction heat, a cooling tube may be inserted in the tube filled with catalyst, which, however, injures the filling condition of the catalyst in general and thus, the distribution of the liquid. If a multi-tube reactor cooled from the outside is employed, uniform dividing of the liquid to every tube is difficult, and consequently the distribution of the liquid becomes less uniform.

Perceiving the merits of the sprinkling type hydrogenating reactors, the present invention provides a novel process for continuously hydrogenating higher aldehydes in the liquid phase, which can be adaptable to a commercial scale apparatus, by making efficient use of the merits and overcoming the defects as mentioned above by employment of the novel mode of operation.

Thus, an object of the invention is to provide a novel process for continuously hydrogenating higher aldehydes, which can be easily controlled and yields the highest degree of hydrogenation ratio, obviating the difficulties in the conventional process, as mentioned above. Other objects will be apparent from the following description.

The primary features of the present invention are obtained by suitably arranging two or more sprinkling type reactors composed of a plurality of multi-tube reactors or the same in combination with a single-tube reactor (or reactors) in series, employing a recycling tower system wherein a definite amount of flow of reaction liquid is recycled in each reactor and a part of the circulating liquid withdrawn from a reactor is sent to the next reactor, and adjusting the amount of the recycled reaction liquid in each reactor in view of the analytical results of the reaction in question.

Figure 2:
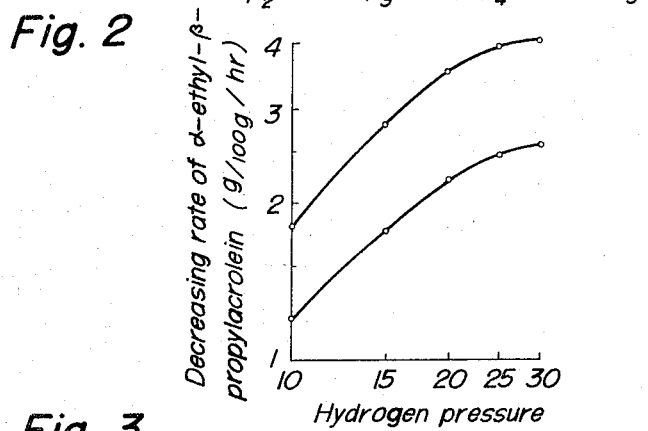
Figure 3:
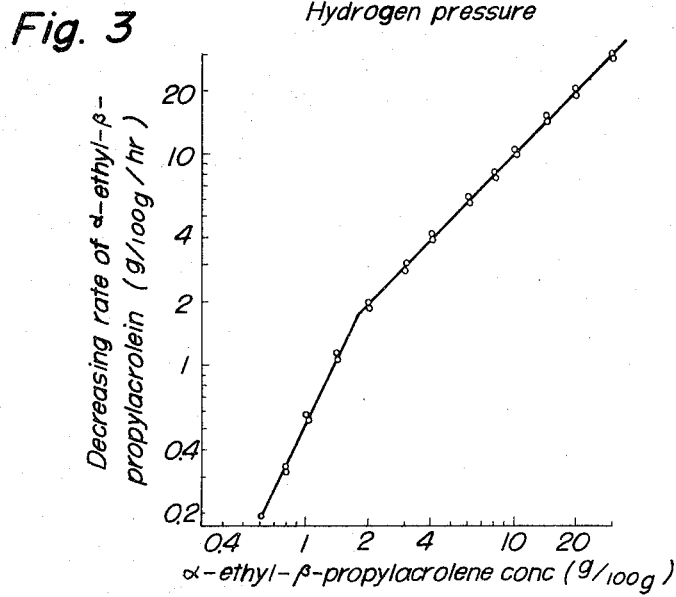

Reference will be made to the appended drawings. FIGURE 1 illustrates a flow chart showing an embodiment of the process of the invention. FIGURE 2 is a graph showing the relationship between the reaction velocity of hydrogenation of higher aldehydes concerning the present invention and the pressure of hydrogen. FIGURE 3 shows a graph showing the relationship between the reaction velocity of hydrogenation of higher aldehydes concerning the present invention and the concentration of the aldehyde.

In FIGURE 1, $R_1$, $R_2$, $R_3$, and $R_4$ represent reactors, and $P$ represents pumps to circulate and move the liquid. An aldehyde material is supplied from $F_1$ and enters into a circulating system of flowing amount $Q_1$. A part of the liquid $F_2$ withdrawn from the reactor $R_1$ is sent to a circultaing system of flowing amount $Q_2$ in the reactor $R_2$, and the flow is similarly passed through the reactors $R_3$ and $R_4$, finally finishing the hydrogenation process. The almost completely hydrogenated liquid $F_5$ is then sent to a purification process. Each of the reactors is supplied with hydrogen $H_0$ at a definite pressure, a part of which may, if necessary, be exhausted ($H$). In the reaction system, the liquid withdrawn from each reactor may be cooled by passing a cooler or by heat-exchange with the liquid entering into the reactor, or a heater may be installed between the pump and the reactor, for the purpose of the protection of the pump and the temperature adjustment of the liquid entering into the reactor. The pressure of the reaction liquid withdrawn from the reactor may conveniently be lowered to ordinary pressure or a pressure lower than the inner pressure of the reactor, and an intermediate tank may be installed for convenience at start and stop of the apparatus.

One of the features of the present invention is in the use of sprinkling type recycling multi-tube reactors, or the same in combination with a single-tube reactor (or reactors), in the reactor system. At the steps where the concentration of aldehyde material (not yet hydrogenated) is higher, the multi-tube type reactors are used, but, at the step where the concentration of the aldehyde is only a few percent, the single-tube type reactor may be employed. This system has a close relation to the recycling system of reaction liquid, as well as the removal of reaction heat which generates abundantly in the hydrogenation reaction. As mentioned above, the significant shortcoming of the sprinkling type is the difficulty in temperature control. But, the increase in the flowing amount of the liquid passed through the catalyst layer, namely, the increase in the heat-transferring amount by the liquid passed through the catalyst layer, avoids a rapid temperature rise. Moreover, the multi-tube reactor has increased heat-conducting area, which lessens the temperature difference throughout the catalyst layer and permits easier maintenance of the pre-determined temperature of the catalyst layer. However, at the step where concentration of the aldehyde material is lower, the reacting amount, and thus the amount of the generated heat, is lower. In the last reactor and, sometimes, in the reactor just before the same, where the aldehyde remaining unreacted is only a few percent or less, the temperature rise in the catalyst layer is hardly observed because of the equilibrium between the generated reaction heat and the heat loss from the reactor itself. Or, oftentimes, external heating is rather necessary for the maintenance of a desired temperature. In such stage, the multi-tube reactor is not necessarily employed, but the single-tube type reactor of lower cost and having a comparatively large diameter may be employed, wherein the distribution of liquid is easier and the temperature can be easily adjusted by a jacket tube.

If the completion of the reaction is attempted by use of a so-called single stage reaction apparatus using only one reactor, the recycling system of liquid is extremely disadvantageous from the view point of the reaction. If the completion of the reaction is attempted in a single pass without using the recycling system, maintainance of a suitable temperature throughout the whole catalyst layer is very difficult, since a vigorous reaction takes place at and near the charging point of the material, while the reaction is exceedingly moderate at and near the discharge point of the reaction mass. In the present invention, against this, the recycling system is employed for the purpose of facilitating temperature control, thereby diluting and averaging the concentration to a certain extent and adjusting the reaction velocity to a desired level.

The liquid flowing down in the catalyst layer is kept in a piston flow within the range of the operating conditions, by utilizing the characteristics of the sprinkling type reactor. For the removal of the reaction heat in the multi-tube reactor, evaporation latent heat of the liquid outside of the tube may be utilized, this method permitting a fully effective utilization of the reaction heat. When such a system is employed, wherein a suitable heat-conductive medium is circulated at the outside of the tube filled with catalyst and the reaction heat absorbed in the medium is heat-exchanged at the outside of the reactor, the space for the cooling medium at the outside of the tube may be sectioned into upper and lower stages of arbitrary number, whereby the temperature at every portion of the catalyst layer along the direction of movement of the reaction liquid is freely adjusted, so that the whole catalyst layer is nearly kept at a definite reaction temperature and the reaction throughout the whole catalyst layer can be secured. Also, in the combination of two or more of the reactors according to the invention, the reaction temperature in each reactor can be freely adjusted to average the load of the total reactors.

After examination of the heat conductivity of the catalyst layer filled in the tubes of the multiple tube reactor, it was recognized that the diameter of each tube filled with the catalyst is suitably about 50 to 130 mm. It is an important factor in the multi-tube type sprinkling reactor to uniformly distribute the sprinkling amount of the liquid to each filled tube. The liquid supplied to the reactor is advantageously flowed into each tube uniformly along the periphery wall at the top of the tubes. For instance, the liquid charged to the reactor is entered from the periphery wall of the distributing plate and flowed down through effluent holes arranged at the center of each filled tube into the catalyst layer. By use of the distributing plate as mentioned here, uniform distribution of liquid to the several tens of the tubes in the reactor is facilitated.

The particle size of the catalyst may be freely selected, for example, from 5 to 25 mm., depending upon the diameter and the amount of sprinkling liquid. In general, a diameter of 10 to 20 mm. is preferable. To fill the catalyst in the tubes, filling in conical shape or volcano shape is not necessarily contemplated, since the size of the catalyst is comparatively large, as compared to the diameter of the tube.

It has been confirmed experimentally that an appreciable drift is not formed within the range of 3 to 30 m.$^3$/m.$^2$. hr. of sprinkling velocity in a tower as high as a few meters when the catalyst is steadily put into each tube from the top under an inert atmosphere which never lowers the catalyst activity. For instance, the ratio of the flowing amount flowed down through a unit section at a portion near the wall of tube to that at the center is 1:1.4, in the case where the highest degree of drift occurs, using a tube of 100 mm. diameter and 5 m. length. This ratio shows that the catalyst is distributed with such uniformity that no trouble occurs from the practical point of view. The catalyst used in this case had average size of 15 mm., and was of macadam state having space ratio of 0.55.

It is necessary to determine the sprinkling velocity according to the filled state of the catalyst, to obtain a full and uniform wetting of the filled catalyst. The minimum flowing amount of 4 m.$^3$/m.$^2$. hr. to obtain the sufficient wet area is in general acknowledged. In the synthesis of butyne-diol by Reppe's reaction, the minimum value is said to be 6 m.$^3$/m.$^2$ hr. In the hydrogenation of a higher aldehyde by use of reactors of the invention, a flowing amount of 5 to 30 m.$^3$/m.$^2$ hr. is suitable. In the multi-tube reactor, a flowing amount of 5 to 15 m.$^3$/m.$^2$ hr. is more suitable, since a part of the catalyst is finely powdered during the reaction, thereby increasing the flowing resistance. In the single-tube reactor having diameter of more than 300 mm., a flowing amount of 15 to 25 m.$^3$/m.$^2$ hr. permits safe and highly efficient operation. In designing the reactors, therefore, the required space section of tower is determined in view of the producing amount and the circulating amount. The recycled amount of the reaction liquid in each reactor is determined in consideration that the composition of the reaction liquid at the inlet of each reactor is well adjusted and the optimum reaction temperature is kept as uniform as possible throughout the whole catalyst layer. This is one of the objects of the invention.

A large amount is recycled in the reactors which deal with the reaction liquid containing a higher concentration of unreacted aldehyde, and, contrarily, nothing or a very little amount is recycled in the last stage reactor in which heat does not generate.

Hydrogen gas may be fed to each reactor from the bottom and exhausted from the top, as shown in FIGURE 1, or the inverse may be effected. Alternatively, hydrogen may be passed through every reactor in series of any sequence, and exhausted from the last reactor. The hydrogen is not necessarily discarded, so far as an inert gas is not accumulated in it. Accordingly, the influence of gas flow in the catalyst layer is negligible in either concurrent and countercurrent flow. While cycling and reuse of hydrogen is necessary in the conventional process due to the use of a large excess, the process of the invention needs no cycling of hydrogen, since the efficiency of hydrogenation is higher, such as more than 95%. This is also an advantage of the invention.

The influence of hydrogen pressure to the hydrogenation of higher aldehydes is as shown in FIGURE 2. At a pressure not higher than 15 atm., the reaction velocity is significantly lowered according to the lowering of the hydrogen pressure, while, at a pressure not lower than 20 atm., the rise of the reaction velocity due to the rise of the hydrogen pressure is slower, namely, the effectiveness of rise of hydrogen pressure is decreased.

As seen from the relationship shown in FIGURE 2, the adsorption velocity of hydrogen might determine the overall velocity at the hydrogen pressure range between 10 and 15 atm. Therefore, a hydrogen pressure of 20 to 35 atm., is desirable, when an economical and highly efficient reaction is expected.

The stage number of the reactors arranged in series may be selected by determination of the reaction degree in one reactor from the heat-removing ability of the reactor and the optimum sprinkling amount. As fully analyzed in the continuous stirring type reactor, increase in the stage number (namely the number of the reactors) is exceedingly effective with recycling of the reaction liquid, for obtaining a higher reaction ratio. The experiments showed that the apparent order number of the reaction of hydrogenation in the reactor in which the reaction liquid is recycled is 2 order at the area of lower concentration of the unreacted aldehyde in the liquid and is 0.7 to 1.2 order at the area of comparatively higher concentration. When the order number of the reaction is higher, the higher conversion is attained only by the more number of the stages of the reaction apparatus. Higher conversion facilitates the purification step of the reaction product after the hydrogenation.

The process of the invention will be more fully illustrated with reference to the following example, which is, however, set forth merely by way of illustration and not by way of limitation.

EXAMPLE

*Production of 2-ethylhexyl alcohol by hydrogenation of α-ethyl-β-propylacrolein*

The hydrogenation was carried out by use of 5 stages of reactors in succession, the first to third being multi-tube reactors and fourth and fifth being single-tube reactors. The catalyst filled therein was an amorphous nickel catalyst having an average size of 15 mm. The space ratio actually measured was 0.55 to 0.60. The feed rate of the material was 600 liters/hr. The feed rates of the liquid to the reactors were 1000 liters/hr. at the first through fourth stages and 500 to 700 liters/hr. at the fifth stage. The sprinkling rates to the reactors were 4 m.$^3$/m.$^2$ hr. in the first through third stages, 6 m.$^3$/m.$^2$ hr. in the fourth stage and 9 m.$^3$/m.$^2$ hr. in the fifth stage. The reaction temperature was adjusted within the range between 110° and 160° C., depending upon the activity of the catalyst. The hydrogen pressure was 20 kg./cm.$^2$. The degrees of hydrogenation in the reactors shown by percentage were as in Table 1 below. The reason why the ability of the first stage is comparatively lower, is in the smaller amount of the catalyst filled in the first reactor, since the poisoning of the catalyst in this stage is comparatively large, which lessons the life of catalyst, thereby the first reactor being given a role as a decontamination tower.

TABLE 1

| | Content of catalyst, liters | Reaction proportion [1] in each reactor, percent |
|---|---|---|
| First stage | 440 | 20–25 |
| Second stage | 600 | 30–35 |
| Third stage | 600 | 30–35 |
| Fourth stage | 400 | 3–10 |
| Fifth stage | 280 | 0.2–0.5 |

[1] Total reaction proportion—Higher than 99.8%.

For cooling of the multi-tube reactors in the example, a circultaing system of a liquid coolant at the outside of the reactor tubes was employed. Uniformity of the catalyst temperature distribution in each reactor tube was obtained by dividing the outside of the tubes in two stages of upper and lower portions and adjusting the flowing amount of the coolant in each portion. In the fourth and fifth single-tube reactors, the temperature was adjusted by passing water or steam through the jacket tubes. In the fourth stage reactor, the temperature adjustment to maintain the reaction temperature is nearly unnecessary, and, in the fifth stage reactor, some heat-supply was necessitated in general. The differences between the temperatures at the maximum and minimum temperature portions of the catalyst layers in the reactors were as in Table 2.

TABLE 2

*Maximum differences of temperature (° C.) in catalyst layers of the reactors*

| | |
|---|---|
| First stage | 5–10 |
| Second stage | 3–7 |
| Third stage | 3–7 |
| Fourth stage | 1–2 |
| Fifth stage | 1–2 |

In this example, the temperature of the circulating liquid was adjusted to a desired degree by passing it through a heater prior to introduction into the reactor. Hydrogen gas was introduced into the bottom of each reactor concurrently with the flow of the liquid, and the exhaust from the top was kept at 0.3 to 1.0 m.³/hr. After 6 months of continuous operation, lowering of the reaction velocity was not observed. The loss of hydrogen was 1 to 2%.

The apparent order number of the hydrogenation reaction of a α-ethyl-β-propylacrolein is shown in FIGURE 3, which was measured at 130° C. by the use of a single reactor. The relationship between the aldehyde concentration in the reaction liquid and the reaction velocity is primary or first order at above about 2% of the concentration and is secondary or second order at below the same concentration. The relationship between the stage number of the reaction (number of the reactors) measured by experiment and the productivity of 2-ethylhexyl alcohol is as shown in Table 3. Herein, three stages and four stages means that the experiments were carried out by use of the reactors up to third and fourth, respectively, stages.

TABLE 3

*Productivity per unit catalyst amount*

| Stage number of reactors | Productivity index |
|---|---|
| Three stages | 60–65 |
| Four stages | 80–85 |
| Five stages | 100 |

What we claim is:

1. A process for the continuous production of alkanols by the hydrogenation of substantially pure aliphatic hydrocarbyl aldehydes having 6 to 13 carbon atoms which comprises passing a substantially pure aliphatic hydrocarbyl aldehyde feed through a plurality of reaction zones in series at a flow rate within the range of about 3 to 30 cubic meters per square meter of catalyst surface, per hour, at least one of the reaction zones in the initial stages of the process being divided into a plurality of smaller reaction zones, and each reaction zone maintained at a reaction temperature of about 110 to 160° C. and a pressure of about 20 to 35 atmospheres, contacting the feed in each reaction zone with hydrogen in the presence of a nickel catalyst which is in a fixed bed and has a particle size in the range of about 5–25 mm., recycling a part of the product of each reaction zone to that zone, and recovering a substantially completely hydrogenated product.

2. A process according to claim 1 in which the feed is contacted with hydrogen in countercurrent flow.

3. A process according to claim 1 in which the feed contacted with hydrogen in concurrent flow.

4. A process according to claim 1 in which the aldehyde is α-ethyl-β-propylacrolein and the product is 2-ethyl-1-hexanol.

References Cited by the Examiner
UNITED STATES PATENTS

| | | | |
|---|---|---|---|
| 1,724,761 | 8/1929 | Holden | 260—638 |
| 2,060,267 | 11/1936 | Toussaint | 260—38 |
| 2,232,674 | 2/1941 | Pyzel. | |
| 2,750,429 | 4/1952 | De Nora et al. | 260—38 |
| 3,118,954 | 1/1964 | Robbins et al. | 260—638 |

BERNARD HELFIN, *Primary Examiner.*

LEON ZITVER, *Examiner.*

M. B. ROBERTS, J. E. EVANS, *Assistant Examiners.*